(12) United States Patent
Mikami (10) Patent No.: US 8,188,383 B2
(45) Date of Patent: May 29, 2012

(54) COMBINATION WEIGHING APPARATUS WITH CONVEYOR APPARATUS HAVING COAXIAL SPRIAL MEMBERS

(75) Inventor: Yoshiharu Mikami, Shiga (JP)

(73) Assignee: Ishida Co., Ltd., Kyoto (JP)

( * ) Notice: Subject to any disclaimer, the term of this patent is extended or adjusted under 35 U.S.C. 154(b) by 285 days.

(21) Appl. No.: 12/566,360

(22) Filed: Sep. 24, 2009

(65) Prior Publication Data

US 2010/0089666 A1    Apr. 15, 2010

(30) Foreign Application Priority Data

Oct. 10, 2008   (JP) ................. 2008-264557

(51) Int. Cl.
*G01G 19/387* (2006.01)
*B65G 33/26* (2006.01)
*B65G 33/30* (2006.01)

(52) U.S. Cl. ..................... 177/25.18; 198/662
(58) Field of Classification Search ............... 177/25.18; 198/662–664
See application file for complete search history.

(56) References Cited

U.S. PATENT DOCUMENTS

| | | | | |
|---|---|---|---|---|
| 3,439,836 A | * | 4/1969 | Ricciardi | 222/240 |
| 3,702,128 A | * | 11/1972 | Trotter, Jr. | 198/582 |
| 4,057,225 A | * | 11/1977 | Ferree | 366/156.2 |
| 5,050,777 A | * | 9/1991 | Buchser | 222/146.6 |
| 5,143,166 A | | 9/1992 | Hough | |
| 5,524,796 A | * | 6/1996 | Hyer | 222/241 |
| 6,420,665 B1 | * | 7/2002 | Solignac | 177/105 |
| 7,301,110 B2 | * | 11/2007 | Hansen | 177/25.18 |
| 7,569,778 B2 | * | 8/2009 | Hansen | 177/25.18 |
| 7,732,718 B2 | * | 6/2010 | Tatsuoka et al. | 177/25.18 |
| 2006/0196701 A1 | | 9/2006 | Hansen | |
| 2009/0277692 A1 | * | 11/2009 | Tatsuoka et al. | 177/25.18 |
| 2010/0018782 A1 | * | 1/2010 | Hansen | 177/25.18 |

FOREIGN PATENT DOCUMENTS

| | | |
|---|---|---|
| EP | 1927828 A1 | 6/2008 |
| EP | 2116823 A2 | 11/2009 |
| JP | 2000-153181 A | 6/2000 |
| JP | 2007-114185 A | 5/2007 |
| JP | 2008-537099 A | 9/2008 |
| JP | 2009288146 A | * 12/2009 |

* cited by examiner

*Primary Examiner* — Randy W Gibson
(74) *Attorney, Agent, or Firm* — Global IP Counselors, LLP (57) ABSTRACT

A combination weighing apparatus includes a distribution unit, a plurality of conveying units and a plurality of weighing hoppers. At least one of the conveying units has a trough and a plurality of spiral members. The trough has an inside edge positioned below the distribution unit and an outside edge positioned above the weighing hopper. The spiral members are placed above a bottom surface of the trough with each of the spiral members defining an external peripheral surface. The spiral members are configured and arranged to be rotatably driven to convey the product material supplied from the distribution unit in a vicinity of the inside edge, along the external peripheral surfaces toward a vicinity of the outside edge. The spiral members are configured and arranged to stop movement of the product material on the external peripheral surfaces when the spiral members are not rotatably driven.

20 Claims, 6 Drawing Sheets

COMBINATION WEIGHING APPARATUS WITH CONVEYOR APPARATUS HAVING COAXIAL SPRIAL MEMBERS

CROSS-REFERENCE TO RELATED APPLICATIONS

This application claims priority to Japanese Patent Application No. 2008-264557 filed on Oct. 10, 2008. The entire disclosure of Japanese Patent Application Nos. 2008-264557 is hereby incorporated herein by reference.

BACKGROUND OF THE INVENTION

1. Field of the Invention

The present invention relates to a combination weighing apparatus.

2. Background Information

A combination weighing apparatus relating to the background art is disclosed in U.S. Patent Application Publication No. 2006/0196701. This combination weighing apparatus comprises a conical distribution table, and a plurality of troughs arranged in a circle around the periphery of the distribution table. A core is placed in each trough, and a helical transport screw is wound around the external surface of each core. The cores are rotatably driven by motors, whereby the transport screws are also rotated. Product material supplied from the distribution table to the inside edges of the troughs is pushed from behind by the rotating transport screws and conveyed toward the outside edges of the troughs.

In view of the above, it will be apparent to those skilled in the art from this disclosure that there exists a need for an improved combination weighing apparatus. This invention addresses this need in the art as well as other needs, which will become apparent to those skilled in the art from this disclosure.

SUMMARY OF THE INVENTION

In the combination weighing apparatus disclosed in U.S. Patent Application Publication No. 2006/0196701, only one transport screw is placed in each trough. In such cases, it is possible for a situation to arise in which the product material cannot be prevented from sliding off of the troughs, the transport screws, and other components, depending on the positioning of the product material when the transport screws have stopped rotating.

The present invention was devised in view of such circumstances, and an object thereof is to obtain a combination weighing apparatus in which it is possible to effectively prevent product material from sliding off of conveying unit having trough.

A combination weighing apparatus according to a first aspect of the present invention includes a distribution unit, a plurality of conveying units and a plurality of weighing hoppers. The distribution unit is configured and arranged to radially distribute product material introduced from above. The conveying units are arranged around a periphery of the distribution unit. The weighing hoppers arranged around a periphery of the conveying units. At least one of the conveying units has a trough and a plurality of spiral members. The trough has an inside edge positioned below the distribution unit and an outside edge positioned above the weighing hopper. The spiral members are placed above a bottom surface of the trough with each of the spiral members defining an external peripheral surface. The spiral members are configured and arranged to be rotatably driven so that the spiral members convey the product material supplied from the distribution unit in a vicinity of the inside edge of the trough, along the external peripheral surfaces toward a vicinity of the outside edge of the trough. The spiral members are configured and arranged to stop movement of the product material on the external peripheral surfaces when the spiral members are not being rotatably driven.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Embodiments of the present invention are described in detail hereinbelow using the drawings. Elements denoted by the same numerical symbols in different drawings represent identical or corresponding elements.

Figure 1:
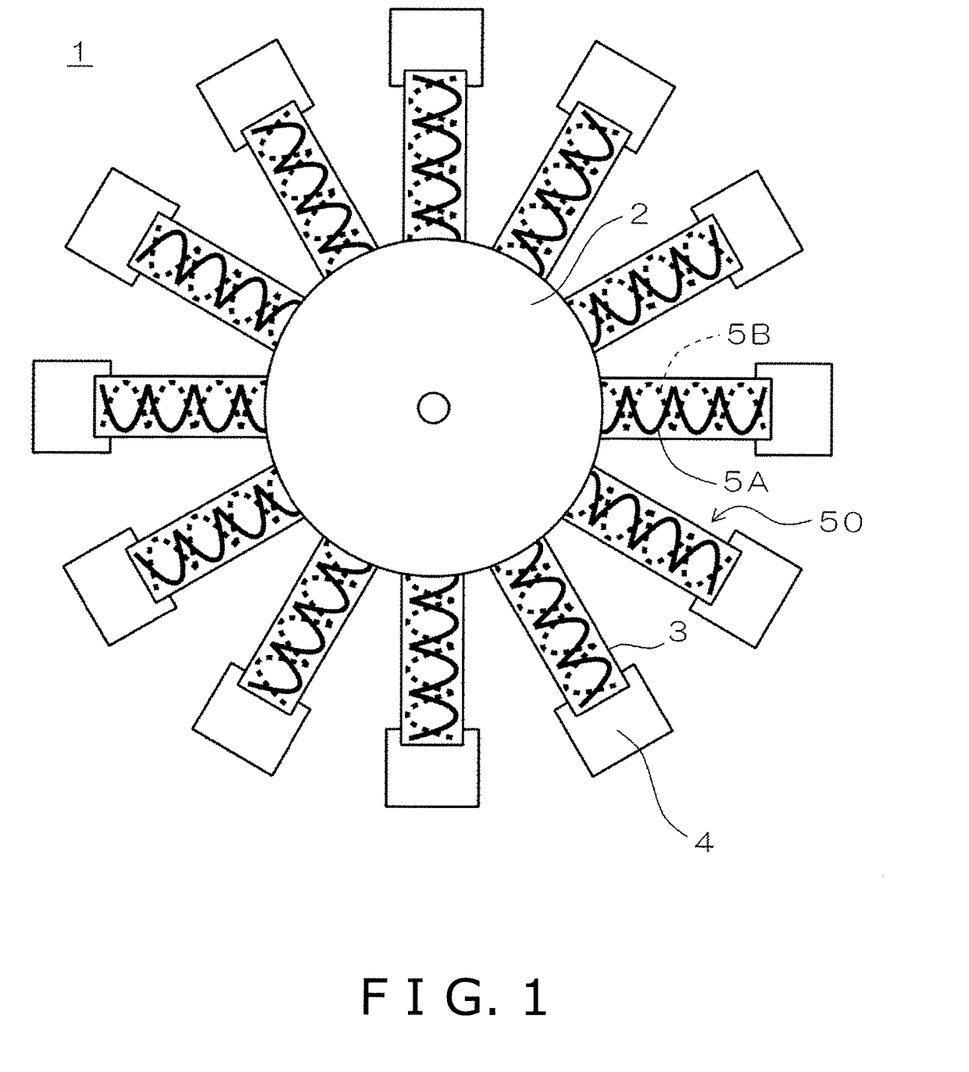
FIG. 1 is a top plan view schematically depicting the overall configuration of a combination weighing apparatus according to an embodiment of the present invention.
Figure 2:
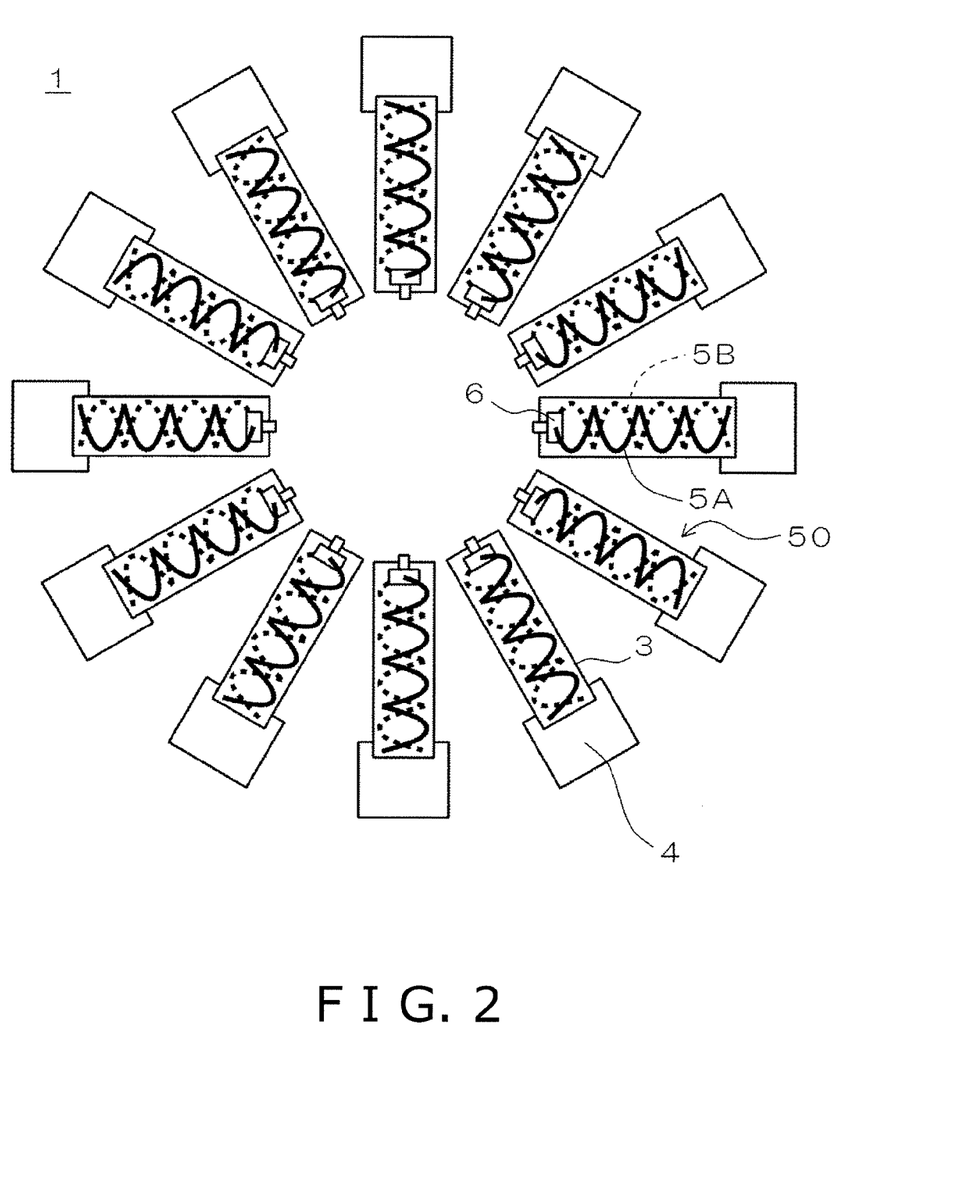
FIG. 2 is a top plan view in which the distribution table is omitted from FIG. 1 to schematically depict the conveying mechanisms and the weighing units.
Figure 3:
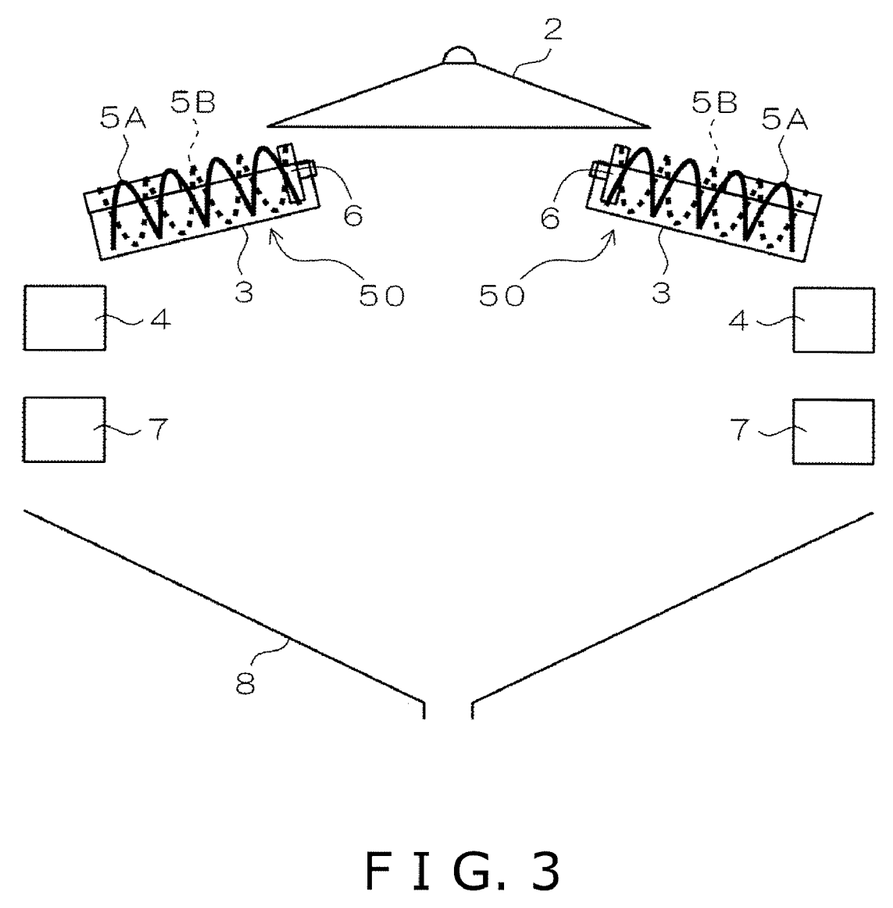
FIG. 3 is a side cross-sectional view schematically depicting the overall configuration of the combination weighing apparatus.

FIG. 1 is a top plan view schematically depicting the overall configuration of a combination weighing apparatus 1 according to an embodiment of the present invention. FIG. 2 is a top plan view in which a distribution table 2 is omitted from FIG. 1 to schematically depict conveying mechanisms 50 and the weighing units. FIG. 3 is a side cross-sectional view schematically depicting the overall configuration of the combination weighing apparatus 1. The combination weighing apparatus 1 includes a distribution table 2, conveying mechanisms 50 (conveying units), pool hoppers 4, weighing hoppers 7, and a collecting chute 8, as shown in FIGS. 1 to 3.

The distribution table 2 is placed in the substantial center of the main body of the combination weighing apparatus 1. The distribution table 2 preferably has the external shape of an eccentric cone in which the position of the apex is eccentric from the center of the bottom surface. The conveying mechanisms 50 are aligned in a circle around the periphery of the distribution table 2. In the present embodiment, the combination weighing apparatus 1 includes twelve conveying mechanisms 50, as shown in FIGS. 1 and 2. In other embodiments, the number of conveying mechanisms 50 is not limited to twelve, and may be another plural number. The pool hoppers 4 are aligned in a circle around the periphery of the conveying mechanisms 50. In other words, the pool hoppers 4 are arranged in a circular alignment. Each pool hopper 4 is placed corresponding to a respective conveying mechanism 50. Therefore, in the present embodiment, the combination weighing apparatus 1 includes twelve pool hoppers 4. The weighing hoppers 7 are aligned below the pool hoppers 4 in a circle around the periphery of the conveying mechanisms 50. In other words, the weighing hoppers 7 are arranged in a circular alignment. Each weighing hopper 7 is placed corresponding to a respective pool hopper 4. Therefore, in the present embodiment, the combination weighing apparatus 1 includes twelve weighing hoppers 7. The collecting chute 8 is placed below the weighing hoppers 7. The pool hoppers 4 and the weighing hoppers 7 together preferably correspond to the weighing units in the present embodiment.

Figure 4:
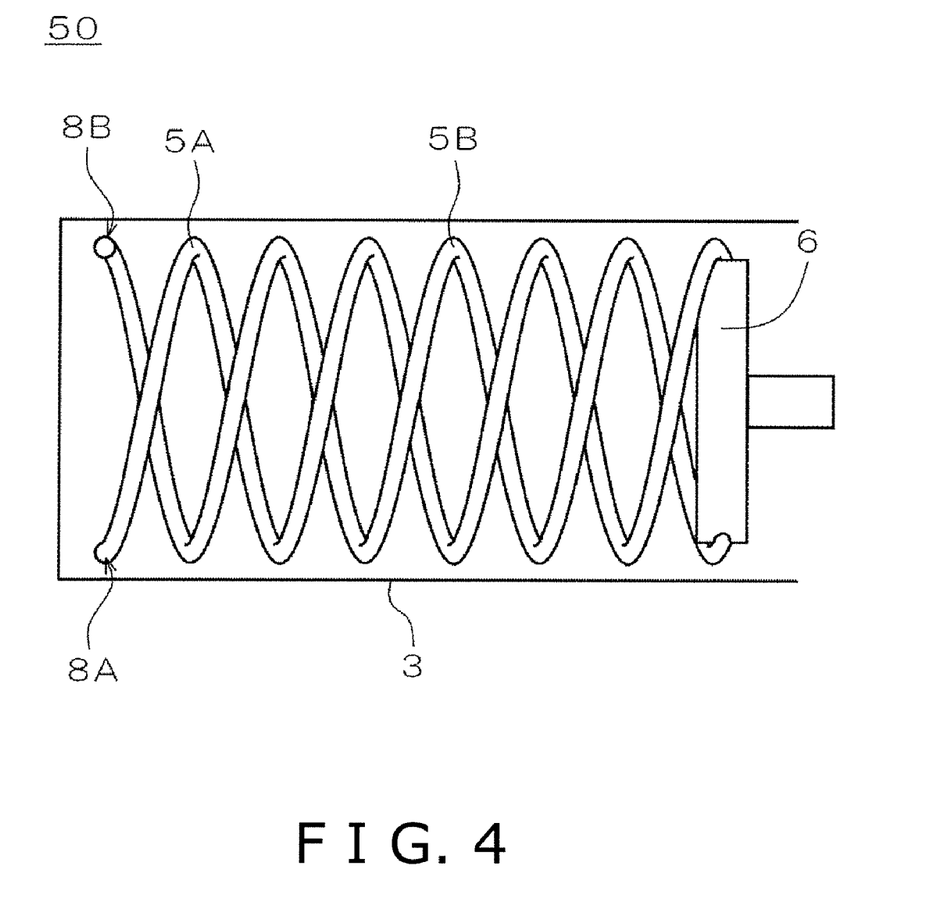
FIG. 4 is an enlarged top plan view showing the structure of one of conveying mechanisms.
Figure 5:
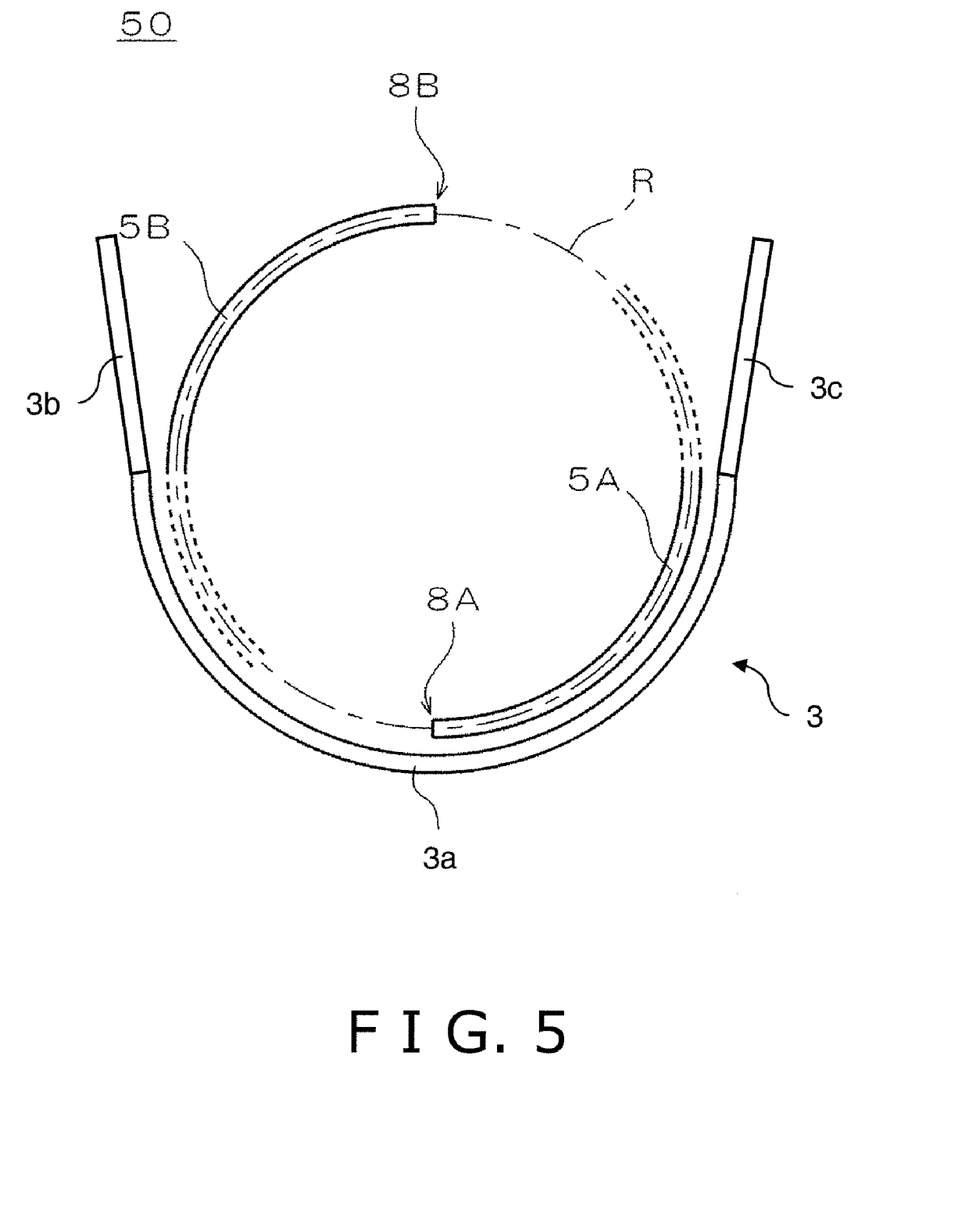
FIG. 5 is a front view showing the structure of one of conveying mechanisms.

FIGS. 4 and 5 are, respectively, a top view and a front view showing the structure of one of conveying mechanisms 50. In FIG. 5, a conveying mechanism 50 is shown as seen from the outside edge of a trough 3 into the inside edge of the trough 3. Each of the other conveying mechanisms 50 not shown in FIGS. 4 and 5 has the same structure as the conveying mechanism 50 shown in FIGS. 4 and 5. The conveying mechanism 50 includes the trough 3 and a plurality (two in the example in FIGS. 4 and 5) of spiral members 5A, 5B, as shown in FIGS. 4 and 5. Each of the spiral members 5A and 5B is formed by a helical rod member.

In this embodiment, the spiral members 5A, 5B have the same shape (as used herein, the term "same shape" includes the meaning of "substantially similar shape"), and the center axes of the spiral members 5A, 5B overlap (as used herein, the term "overlap" includes the meaning of "substantially overlap") each other with two helices formed by the spiral members 5A, 5B differing by a translation along the center axis. In other words, in the present embodiment, the spiral members 5A, 5B form a double helix structure. The spiral members 5A, 5B rotate at the same speed in the same direction around the respective center axes as the respective rotational centers (as used herein, "rotate around a spiral member's center axis as a rotational center" includes the meaning of "rotate around a spiral member's center axis substantially as a rotational center"). The spiral members 5A, 5B are placed in a positional relationship in which a 360° helical cycle is substantially equally divided, or in this embodiment, bisected (as used herein "being bisected" includes the meaning of "being substantially bisected"). In other words, the spiral members 5A, 5B are placed in a positional relationship such that a circumference R hypothetically defined at the outside edge of the trough 3 is bisected by the distal ends 8A, 8B (free ends) of the spiral members 5A, 5B, as shown in FIG. 5. The circumference R is defined as the rotational path of the distal ends 8A, 8B of the spiral members 5A, 5B. In other embodiments, the spiral members 5A, 5B may have mutually different shapes. In such cases, it is possible that the centers of two circumferences R corresponding to the respective spiral members 5A, 5B do not overlap. However, in those cases, when the spiral members 5A, 5B are moved in parallel (moved without rotating) so that their centers overlap, the two half lines extending from the coincident center toward the distal ends 8A, 8B bisect the two circumferences R, as in the present embodiment. In FIGS. 1 to 3, for the sake of clarifying the distinction between the spiral members 5A and the spiral members 5B, the spiral members 5A are shown by solid lines, and the spiral members 5B are shown by dashed lines.

The inside edges of the troughs 3 are positioned below the external peripheral edges of the distribution table 2, and the outside edges of the troughs 3 are positioned above the pool hoppers 4, as shown in FIG. 3. Since the pool hoppers 4 are positioned above the weighing hoppers 7, the outside edges of the troughs 3 are also positioned above the weighing hoppers 7. Each trough 3 has the shape of a combination of the remaining bottom half 3a after the substantial top half of a cylinder is cut away from the cylinder, and two side walls 3b, 3c added in proximity to the outside edge of the remaining bottom half 3a (see FIG. 5). The side walls 3b, 3c are continuous with the cutaway surfaces of the bottom halves 3a which appear when the top halves have been cut away. Therefore, each trough 3 has a bottom surface defined as the inside surface of a semicylinder, two side surfaces continuous with the bottom surface, and an open top surface. The gaps between the side surfaces of the troughs 3 and the external peripheral surfaces of the spiral members 5A, 5B are wider than the gaps between the bottom surfaces of the troughs 3 and the external peripheral surfaces of the spiral members 5A, 5B as shown in FIG. 5. As used herein, the term "external peripheral surface" of the spiral member 5A or 5B refers to a hypothetical surface defined so as to include (encompass) the entire spiral member 5A or 5B. In the present embodiment, the hypothetical surface encompassing the spiral member 5A or 5B is formed as a cylindrical surface since each of the spiral members 5A and 5B forms an overall shape of a cylinder.

The spiral members 5A, 5B are turnably disposed above the bottom surfaces of the troughs 3. The inside ends of the spiral members 5A, 5B are fixed to rotating shafts 6. The rotating shafts 6 are located along the center axes of the spiral members 5A, 5B (as used herein, "being located along the center axes" includes the meaning of "being located substantially along the center axes"). The rotating shafts 6 are rotatably driven by motors (not shown), thereby causing the spiral members 5A, 5B to be rotatably driven in a direction that conveys product material on the external peripheral surfaces of the spiral members 5A, 5B from the proximities of the inside edges of the troughs 3, which are over the external peripheral surfaces of the spiral members 5A, 5B, along the external peripheral surfaces of the spiral members 5A, 5B toward the proximities of the outside edges of the troughs 3, which are over the external peripheral surfaces of the spiral members 5A, 5B. In cases in which product material has fallen inside the troughs 3, the rotating shafts 6 are rotatably driven by the motors (not shown), whereby the spiral members 5A, 5B are rotatably driven in a direction that pushes product material inside the troughs 3 from the vicinities of the inside edges of the troughs 3 out toward the vicinities of the outside edges of the troughs 3. As described above, the spiral members 5A, 5B are placed in a positional relationship such that 360° helical cycles are bisected. Therefore, referring to FIG. 5, 180° rotation of the rotating shafts 6 causes a transition from a state in which the distal ends 8A are positioned at the lowest points of the troughs 3 to a state in which the distal ends 8B are positioned at the lowest points of the troughs 3.

In the conventional combination weighing apparatus disclosed in U.S. Patent Application Publication No. 2006/0196701 as described above, only one transport screw member is placed corresponding to each trough. Therefore, the distal end of the transport screw does not return to its original position unless the transport screw member completes a full rotation (360°). In other words, a helical cycle is 360° in the conventional combination weighing apparatus. Therefore, a situation may arise in which the product material cannot be prevented from sliding off the trough, depending on the position of the distal end of the transport screw when rotation has stopped. This is because the product material can be prevented from falling off in cases in which the transport screw has stopped at a position where the distal end is in contact with the product material, but in cases in which the transport screw is stopped at a position where the distal end is not in contact with the product material, the product material cannot be supported from in front by the distal end, and the product material cannot be prevented from sliding off.

On the other hand, with the combination weighing apparatus 1 according to the present embodiment, the two spiral members 5A, 5B are placed corresponding to each trough 3, and the spiral members 5A, 5B are placed in positional relationship such that the distal ends 8A, 8B of the spiral members 5A, 5B substantially equally divide the circumference R defined as the rotational paths of the distal ends 8A, 8B. Therefore, it is possible to effectively prevent unintended sliding off of the product material from the conveying mechanisms 50, because there is a high possibility that the product material will come in contact with any of the outside end vicinities of the spiral members 5A, 5B when the spiral members 5A, 5B have stopped rotating, for example.

The troughs 3 are placed at an incline in a forward-slanted orientation so that the outside edges thereof are positioned lower than the inside edges, as shown in FIG. 3. The bottom surfaces of the troughs 3 are thereby defined as downward slopes from the inside edges toward the outside edges. Since the troughs 3 are inclined downward in the direction in which product material is conveyed, the product material is readily conveyed in the conveyed direction when the spiral members 5A, 5B are being rotatably driven. When the spiral members 5A, 5B are not being rotatably driven, the product material readily stops on the external peripheral surfaces of the spiral members 5A, 5B due to being in contact with the spiral members 5A, 5B.

The following is a description, made with reference to FIGS. 1 through 5, of the action of the combination weighing apparatus 1. The product material as the weighed object (e.g., raw meat or other foodstuffs) is dropped from above the distribution table 2 onto the center of the top surface of the distribution table 2. The product material dropped onto the distribution table 2 is distributed in a radial manner by the rotatably driven distribution table 2, and the product material is discharged from the external peripheral edge of the distribution table 2 and supplied from above to the proximities of the inside edges of the troughs 3, which are over the external peripheral surfaces of the spiral members 5A, 5B.

In the conveying mechanisms 50, the spiral members 5A, 5B are rotatably driven intermittently. Therefore, the product material supplied from the distribution table 2 to the proximities of the inside edges of the troughs 3, which are over the external peripheral surfaces of the spiral members 5A, 5B, mainly slides down over the external peripheral surfaces of the spiral members 5A, 5B forming downward slopes similar to the troughs 3, and the product material is conveyed over the external peripheral surfaces of the spiral members 5A, 5B from the inside edge proximities of the troughs 3 toward the outside edge proximities of the troughs 3 while being pulled along by the spiral members 5A, 5B, which are being rotatably driven. Otherwise, the product material supplied from the distribution table 2 to the inside edge proximities of the troughs 3, which are over the external peripheral surfaces of the spiral members 5A, 5B, might fall through the gaps between the spiral members 5A and the spiral members 5B into the spaces inside the spiral members 5A, 5B, and then slide down in these inside spaces. The product material might then be conveyed through the inside spaces from the inside edge proximities of the troughs 3 toward the outside edge proximities of the troughs 3 while being pulled along by the spiral members 5A, 5B, which are being rotatably driven in the inside spaces. Otherwise, the product material supplied from the distribution table 2 to the inside edge proximities of the troughs 3, which are over the external peripheral surfaces of the spiral members 5A, 5B, might also be conveyed over the bottom surfaces 3a of the troughs 3 from the inside edge proximities of the troughs 3 toward the outside edge proximities of the troughs 3 by sliding down the downward slopes while being pushed from behind by the rotatably driven spiral members 5A, 5B, after the product material falls onto the bottom surfaces 3a of the troughs 3 through the gaps between the spiral members 5A and the spiral members 5B. The product material moving over the external peripheral surfaces of the spiral members 5A, 5B might also slide over the external peripheral surfaces of the spiral members 5A, 5B down to the left and right in the conveying direction, and then get stuck in between the external peripheral surfaces of the spiral members 5A, 5B and the side surfaces 3b, 3c or bottom surfaces 3a of the troughs 3. In such cases, the product material is conveyed over the external peripheral surfaces of the spiral members 5A, 5B from the inside edge proximities of the troughs 3 toward the outside edge proximities of troughs 3 while remaining in contact with the external peripheral surfaces of the spiral members 5A, 5B and the side surfaces 3b, 3c or bottom surfaces 3a of the troughs 3.

The product material discharged from the conveying mechanisms 50 is supplied to the pool hoppers 4 and is temporarily retained inside the pool hoppers 4. The product material discharged from the pool hoppers 4 is supplied to the weighing hoppers 7 and is temporarily stored inside the weighing hoppers 7, where the product material is weighed by load cells or other weighing means (not shown). Calculations are then made to determine a hopper combination consisting of one or a plurality of the weighing hopper(s) 7 selected among all of the weighing hoppers 7 retaining product material, the one or the plurality of the weighing hopper(s) 7 being selected so that its or their total weight value coincides with or is nearest to a target weight. And the product material retained in one or a plurality of selected weighing hoppers 7 is discharged. The product material discharged from the weighing hoppers 7 is collected by the collecting chute 8 and is discharged from the combination weighing apparatus 1 toward downstream devices (not shown).

As described above, with the combination weighing apparatus 1 according to the present embodiment, two spiral members 5A, 5B are placed corresponding to each trough 3, and the two spiral members 5A, 5B are placed in a positional relationship so as to bisect a helical cycle. Therefore, the overall pitch of the two spiral members 5A, 5B (the gap between the peak of a spiral member 5A and the peak of the spiral member 5B adjacent to the former peak) is narrower. The product material is mainly designed so as to be conveyed along the external peripheral surfaces each of which defined by the two spiral members 5A, 5B. Therefore, product material conveyed over the external peripheral surfaces of the spiral members 5A, 5B readily comes in contact with the spiral members 5A, 5B and is readily stopped on the external peripheral surfaces of the spiral members 5A, 5B when the spiral members 5A, 5B are not being rotatably driven. Consequently, when the spiral members 5A, 5B are not being rotatably driven, the product material is effectively prevented from sliding off of the conveying mechanisms 50. In other words, while the rotation of the spiral members 5A, 5B remains stopped, the spiral members 5A, 5B function as stoppers for stopping unintended sliding off of the product material. More specifically, the spiral members 5A, 5B are configured and arranged to hold the product material between the external peripheral surfaces and at least one of the bottom surface 3a and the side surfaces 3b, 3c of the trough 3 when the spiral members 5A, 5B are not being rotatably driven. Thus, the product material conveyed over the external peripheral surfaces of the spiral members 5A, 5B comes in contact with the spiral members 5A, 5B and the trough 3 when the spiral members 5A, 5B are not being rotatably driven, whereby the product material readily stops on the external peripheral surfaces of the spiral members 5A, 5B.

The stopper function is particularly effective in cases in which the overall pitch of the spiral members 5A, 5B is half or less of the length of the product material in the conveying direction (i.e., the length of the product in the conveyed direction is twice or more of the overall pitch of the spiral members 5A, 5B). The reason is because product material being conveyed will, in most cases, come in contact with at least two peaks of spiral members 5A, 5B. Consequently, product material being conveyed on the external peripheral surfaces of the spiral members 5A, 5B is effectively prevented from sliding off the conveying mechanism 50 when the spiral members 5A, 5B are not being rotatably driven.

With the combination weighing apparatus 1 according to the present embodiment, product material conveyed over the external peripheral surfaces of the spiral members 5A, 5B will sometimes come in contact with both the spiral members 5A, 5B and the troughs 3 when the spiral members 5A, 5B are not being rotatably driven, and the product material is readily stopped on the external peripheral surfaces of the spiral members 5A, 5B. Consequently, the product material is more effectively prevented from sliding off the conveying mechanisms 50 when the spiral members 5A, 5B are not being rotatably driven. In other words, while the rotation of the spiral members 5A, 5B remains stopped, the spiral members 5A, 5B and the troughs 3 collectively function as stoppers for stopping unintended sliding off of the product material.

With the combination weighing apparatus 1 according to the present embodiment, the gaps between the side surfaces of the troughs 3 and the external peripheral surfaces of the spiral members 5A, 5B are wider than the gaps between the bottom surfaces of the troughs 3 and the external peripheral surfaces of the spiral members 5A, 5B. Consequently, the product material conveyed over the external peripheral surfaces of the spiral members 5A, 5B readily fits in or falls between the external peripheral surfaces of the spiral members 5A, 5B and the side surfaces 3b, 3c of the troughs 3, and readily stops between the external peripheral surfaces of the spiral members 5A, 5B and the side surfaces 3b, 3c of the troughs 3 when the spiral members 5A, 5B are not being rotatably driven.

With the combination weighing apparatus 1 according to the present embodiment, two spiral members 5A, 5B are placed corresponding to each trough 3, and the two spiral members 5A, 5B are placed in a positional relationship so as to bisect a helical cycle. Therefore, the circumference R hypothetically defined at the outside edge of the trough 3 is bisected by two distal ends 8A, 8B of the two spiral members 5A, 5B. Therefore, unintended sliding of the product material off of the conveying mechanism 50 can be effectively prevented, because there is a high possibility that the product material will come in contact in proximity to either of the distal ends 8A, 8B of the two spiral members 5A, 5B when the spiral members 5A, 5B have stopped rotating. In other words, while the rotation of the spiral members 5A, 5B remains stopped, the spiral members 5A, 5B function as stoppers for stopping unintended sliding off of the product material.

Modified Example 1

Figure 6:
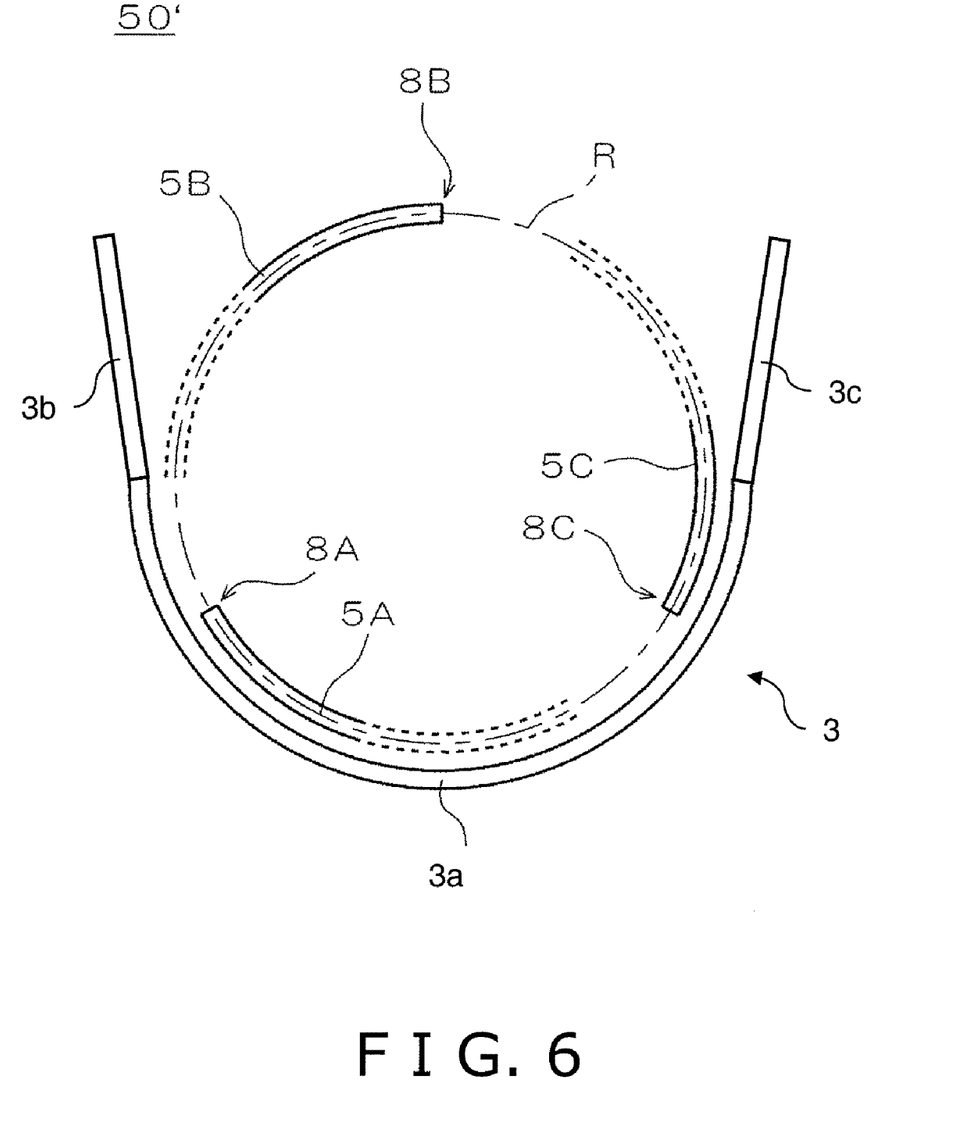
FIG. 6 is a front view showing the structure of one of conveying mechanisms according to a modification.

FIG. 6 is a front view showing the structure of a conveying mechanism 50' according to the modification. In the embodiment described above, two spiral members 5A, 5B were placed corresponding to each trough 3. On the other hand, in this modified example, three spiral members 5A to 5C are placed in each trough 3.

All of the spiral members 5A to 5C have the same shape (as used herein, the term "same shape" includes the meaning of "substantially the similar shape"), and the center axes of all the spiral members 5A to 5C overlap (as used herein, the term "overlap" includes the meanings of "substantially overlap") each other. The spiral members 5A to 5C rotate at the same speed in the same direction around the respective center axes as the respective rotational centers (as used herein, "rotate around a spiral member's center axis as a rotational center" includes the meaning of "rotate around a spiral member's center axis substantially as a rotational center"). The spiral members 5A to 5C are placed in a positional relationship of substantially equally dividing, or in this modified embodiment, trisecting (as used herein, the term "trisect" includes the meanings "substantially trisect") a 360° helical cycle. In other words, the spiral members 5A to 5C are placed in a positional relationship such that the circumference R hypothetically defined at the outside edge of the trough 3 is trisected by the distal ends 8A, 8B, 8C of the spiral members 5A, 5B, 5C, as shown in FIG. 6. The circumference R is defined as the rotational path of the distal ends of the spiral members 5A to 5C. In another modification, the spiral members 5A to 5C may have mutually different shapes. In such cases, it is possible that the centers of three circumferences R corresponding to the respective spiral members 5A to 5C do not overlap. However, in those cases, when all of the spiral members 5A to 5C are moved in parallel (moved without rotating) so that their centers all overlap, the three half lines extending from the coincident center toward the distal ends 8A to 8C trisect the three circumferences R, as in the modified example shown in FIG. 6. Therefore, a 120° rotation of the rotating shaft 6 causes a transition from the distal end 8A being positioned at the lowest point of the trough 3 to the distal end 8B being positioned at the lowest point of the trough 3, and a further 120° rotation of the rotating shaft 6 causes a transition from the distal end 8B being positioned at the lowest point of the trough 3 to the distal end 8C being positioned at the lowest point of the trough 3.

According to the modification example shown in FIG. 6, three spiral members 5A to 5C are placed corresponding to each trough 3, and the three spiral members 5A to 5C are placed in a positional relationship so as to trisect a helical cycle. Therefore, the overall pitch of the three spiral members 5A to 5C (the gap between the peak of the spiral member 5A and the peak of the spiral member 5B adjacent thereto, the gap between the peak of the spiral member 5B and the peak of the spiral member 5C adjacent thereto, or the gap between the peak of the spiral member 5C and the peak of the spiral member 5A adjacent thereto) is narrower. The product material is designed to be conveyed along the external peripheral surfaces each of which is defined by the three spiral members 5A to 5C. Therefore, product material conveyed over the external peripheral surfaces of the spiral members 5A to 5C readily comes in contact with the spiral members 5A to 5C and is readily stopped on the external peripheral surfaces of the spiral members 5A to 5C when the spiral members 5A to 5C are not being rotatably driven. Consequently, when the spiral members 5A to 5C are not being rotatably driven, the product material is effectively prevented from sliding off of the conveying mechanisms 50'. In other words, while the rotation of the spiral members 5A to 5C remains stopped, the spiral members 5A to 5C function as stoppers for stopping unintended sliding off of the product material.

According to the modified example, while the rotation of the spiral members 5A to 5C remains stopped, there is an even higher possibility that the product material will come in contact with the vicinities of any of the distal ends 8A to 8C of the three spiral members 5A to 5C, and it is therefore to more effectively prevent unintended sliding of the product material off of the trough 3. In other words, while the rotation of the spiral members 5A to 5C remains stopped, the spiral members 5A to 5C function as stoppers for stopping unintended sliding off of the product material.

It is also possible to place four or more spiral members in one trough 3.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A combination weighing apparatus comprising:
    a distribution unit configured and arranged to radially distribute product material introduced from above;
    a plurality of conveying units arranged around a periphery of the distribution unit; and
    a plurality of weighing hoppers arranged around a periphery of the conveying units,
    at least one of the conveying units having
        a trough having an inside edge positioned below the distribution unit and an outside edge positioned above the weighing hopper, and
        a plurality of spiral members placed above a bottom surface of the trough with each of the spiral members defining an external peripheral surface, the spiral members being configured and arranged to be rotatably driven so that the spiral members convey the product material supplied from the distribution unit in a vicinity of the inside edge of the trough, along the external peripheral surfaces toward a vicinity of the outside edge of the trough,
        the spiral members being positioned with respect to one another for rotation about a center axis such that distal ends of the spiral members are disposed in positions that substantially equally divide a circumference defined by a rotational path of the distal ends about the center axis, and
        the distal ends of the spiral members being configured and arranged as stoppers that stop movement of the product material such that the product material is prevented from sliding off external peripheral surfaces of the conveying unit when the spiral members are not being rotatably driven.

2. The combination weighing apparatus according to claim 1, wherein
    the spiral members are configured and arranged to hold the product material between the external peripheral surfaces and at least one of the bottom surface and a side surface of the trough when the spiral members are not being rotatably driven.

3. The combination weighing apparatus according to claim 2, wherein
    the trough and the spiral members are arranged so that a gap between the side surface of the trough and the external peripheral surfaces of the spiral members is wider than a gap between the bottom surface of the trough and the external peripheral surfaces of the spiral members.

4. The combination weighing apparatus according to claim 1, wherein
    an overall pitch of the spiral members is equal to or less than half of a length of the product material in a direction in which the product material is conveyed.

5. The combination weighing apparatus according to 1, wherein
    the trough is placed with an inclined orientation so that the outside edge is positioned lower than the inside edge.

6. The combination weighing apparatus according to claim 3, wherein
    the spiral members are placed with respect to each other such that distal ends of the spiral members are disposed in positions that substantially equally divide circumferences defined as rotational paths of the distal ends, and
    the distal ends of the spiral members are configured and arranged as stoppers that stop the product material from sliding off the conveying unit when the spiral members are not being rotatably driven.

7. The combination weighing apparatus according to claim 6, wherein
    an overall pitch of the spiral members is equal to or less than half of a length of the product material in a direction in which the product material is conveyed.

8. The combination weighing apparatus according to claim 7, wherein
    the trough is placed with an inclined orientation so that the outside edge is positioned lower than the inside edge.

9. The combination weighing apparatus according to claim 4, wherein
    the spiral members have a constant pitch along their respective lengths.

10. A combination weighing apparatus comprising:
    a distribution unit configured and arranged to radially distribute product material introduced from above;
    a plurality of conveying units arranged around a periphery of the distribution unit; and
    a plurality of weighing hoppers arranged around a periphery of the conveying units, at least one of the conveying units having
- a trough having an inside edge positioned below the distribution unit and an outside edge positioned above the weighing hopper, and
- a first spiral member and a second spiral member being co-axial with one another and being angularly offset from one another, placed above a bottom surface of the trough with each of the first and second spiral members defining an external peripheral surface, the first and second spiral members being configured and arranged to be rotatably driven so that the first and second spiral members convey the product material supplied from the distribution unit in a vicinity of the inside edge of the trough, along the external peripheral surfaces toward a vicinity of the outside edge of the trough,
- the first and second spiral members being configured and arranged to stop movement of the product material on the external peripheral surfaces when the first and second spiral members are not being rotatably driven.

11. The combination weighing apparatus according to claim 10, wherein
the first and second spiral members are configured and arranged to hold the product material between the external peripheral surfaces and at least one of the bottom surface and a side surface of the trough when the first and second spiral members are not being rotatably driven.

12. The combination weighing apparatus according to claim 11, wherein
the trough and the first and second spiral members are arranged so that a gap between the side surface of the trough and the external peripheral surfaces of the first and second spiral members is wider than a gap between the bottom surface of the trough and the external peripheral surfaces of the first and second spiral members.

13. The combination weighing apparatus according to claim 10, wherein
the first and second spiral members are placed with respect to each other such that distal ends of the spiral members are disposed in positions that substantially equally divide circumferences defined as rotational paths of the distal ends, and
the distal ends of the first and second spiral members are configured and arranged as stoppers that stop the product material from sliding off the conveying unit when the first and second spiral members are not being rotatably driven.

14. The combination weighing apparatus according to claim 10, wherein
an overall pitch of the first and second spiral members is equal to or less than half of a length of the product material in a direction in which the product material is conveyed.

15. The combination weighing apparatus according to claim 10, wherein
the trough is placed with an inclined orientation so that the outside edge is positioned lower than the inside edge.

16. A combination weighing apparatus comprising:
a distribution unit configured and arranged to radially distribute product material introduced from above;
a plurality of conveying units arranged around a periphery of the distribution unit; and
a plurality of weighing hoppers arranged around a periphery of the conveying units,
at least one of the conveying units having
- a trough having an inside edge positioned below the distribution unit and an outside edge positioned above the weighing hopper, and
- a plurality of spiral members placed above a bottom surface of the trough with each of the spiral members defining an external peripheral surface, the spiral members being configured and arranged to be rotatably driven so that the spiral members convey the product material supplied from the distribution unit in a vicinity of the inside edge of the trough, along the external peripheral surfaces toward a vicinity of the outside edge of the trough, the spiral members having an overall pitch that is constant along their axial lengths,
- the spiral members being configured and arranged to stop movement of the product material on the external peripheral surfaces when the spiral members are not being rotatably driven.

17. The combination weighing apparatus according to claim 16, wherein
the spiral members are configured and arranged to hold the product material between the external peripheral surfaces and at least one of the bottom surface and a side surface of the trough when the spiral members are not being rotatably driven.

18. The combination weighing apparatus according to claim 17, wherein
the trough and the spiral members are arranged so that a gap between the side surface of the trough and the external peripheral surfaces of the spiral members is wider than a gap between the bottom surface of the trough and the external peripheral surfaces of the spiral members.

19. The combination weighing apparatus according to claim 16, wherein
the spiral members are placed with respect to each other such that distal ends of the spiral members are disposed in positions that substantially equally divide circumferences defined as rotational paths of the distal ends, and
the distal ends of the spiral members are configured and arranged as stoppers that stop the product material from sliding off the conveying unit when the spiral members are not being rotatably driven.

20. The combination weighing apparatus according to claim 16, wherein
the trough being placed with an inclined orientation so that the outside edge is positioned lower than the inside edge.

* * * * *

UNITED STATES PATENT AND TRADEMARK OFFICE
CERTIFICATE OF CORRECTION

PATENT NO.       : 8,188,383 B2
APPLICATION NO.  : 12/566360
DATED            : May 29, 2012
INVENTOR(S)      : Yoshiharu Mikami It is certified that error appears in the above-identified patent and that said Letters Patent is hereby corrected as shown below:

On the cover sheet, please change the listing of [54] and at column 1, lines 1-3, title from COMBINATION WEIGHING APPARATUS WITH CONVEYOR APPARATUS HAVING COAXIAL SPRIAL MEMBERS to -- COMBINATION WEIGHING APPARATUS WITH CONVEYOR APPARATUS HAVING COAXIAL SPIRAL MEMBERS --

Signed and Sealed this
Ninth Day of October, 2012

David J. Kappos
*Director of the United States Patent and Trademark Office*